(12) United States Patent
Sodagar

(10) Patent No.: US 11,196,778 B2
(45) Date of Patent: Dec. 7, 2021

(54) NBMP WORKFLOW MANAGEMENT IN 5G FLUS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/034,437

(22) Filed: Sep. 28, 2020

(65) Prior Publication Data

US 2021/0120049 A1    Apr. 22, 2021

Related U.S. Application Data

(60) Provisional application No. 62/923,430, filed on Oct. 18, 2019.

(51) Int. Cl.
*H04L 29/06* (2006.01)
*H04N 21/2187* (2011.01)

(52) U.S. Cl.
CPC ......... *H04L 65/1069* (2013.01); *H04L 65/60* (2013.01); *H04N 21/2187* (2013.01)

(58) Field of Classification Search
CPC ............... H04L 65/1069; H04L 65/60; H04L 65/608; H04L 67/02; H04L 67/16; H04L 67/146; H04N 21/2187
USPC ....................................................... 709/222
See application file for complete search history.

(56) References Cited

PUBLICATIONS

"Text of ISO/IECDIS 23090-8 Network-based Media Processing",Systems Subgroup,ISO/IECJTC1/SC29ANG11(N18657),dated Jul. 12, 2019, pp. 1-156,Gothenburg,SE (Year: 2019).*
"3rd Generation Partnership Project; Technical Specification Group Services and System Aspects; Uplink Streaming(Release16)",3GPPTS26.238V16.2.0,dated Sep. 2019,pp. 1-43 (Year: 2019).*
"Text of ISO/IEC DIS 23090-8 Network-based Media Processing", Systems Subgroup, ISO/IEC JTC 1/SC 29/WG 11 (N 18657), dated Jul. 12, 2019, pp. 1-156, Gothenburg, SE.
"3rd Generation Partnership Project; Technical Specification Group Services and System Aspects; Uplink Streaming (Release 16)", 3GPP TS 26.238 V16.2.0, dated Sep. 2019, pp. 1-43.

* cited by examiner

*Primary Examiner* — Glenford J Madamba
(74) *Attorney, Agent, or Firm* — Sughrue Mion, PLLC

(57) ABSTRACT

Systems and methods for media processing and streaming are provided. A method includes sending, by a Network-Based Media Processing (NBMP) source, a request to establish a Framework for Live Uplink Streaming (FLUS) session between a FLUS source and a FLUS sink; receiving, by the NBMP source, an address of an NBMP workflow manager from the FLUS source after the FLUS session is established; and sending, by the NBMP source to the NBMP workflow manager via a path, of the address, that does not include the FLUS source and the FLUS sink, a request to create or update a workflow for processing media content.

20 Claims, 8 Drawing Sheets

NBMP WORKFLOW MANAGEMENT IN 5G FLUS

CROSS-REFERENCE TO RELATED APPLICATION

This application claims priority from U.S. Provisional Application No. 62/923,430, filed on Oct. 18, 2019, the disclosure of which is incorporated herein by reference in its entirety.

FIELD

Embodiments of this disclosure are directed to media processing and streaming methods and systems, more particularly to Moving Picture Experts Group (MPEG) Network-Based Media Processing (NBMP) and Framework for Live Uplink Streaming (FLUS) methods and systems.

BACKGROUND

Moving Picture Experts Group (MPEG) Network-Based Media Processing (NBMP) project has developed a concept of processing media on the cloud. However, current NBMP design does not provide a clear method for monitoring. "Text of ISO/IEC DIS 23090-8 Network-based Media Processing", ISO/IEC JTC 1/SC 29/WG 11 (N 18657), dated Jul. 12, 2019, is incorporated herein in its entirety.

3rd Generation Partnership Project (3GPP) Framework for Live Uplink Streaming (FLUS) protocol provides a mechanism for uplink streaming of multimedia content from a source device to a network and sending/distributing that content to one or more destinations. "3rd Generation Partnership Project; Technical Specification Group Services and System Aspects; Uplink Streaming (Release 16)", 3GPP TS 26.238 V16.2.0, dated September 2019, is incorporated herein in its entirety.

SUMMARY

In the NBMP standard, an NBMP source is the entity providing workflow description to a workflow manager to create, run, manage, and monitor a media workflow. The interaction between the NBMP source and the workflow manager is through a set of NBMP operation APIs.

In the case of the 3GPP FLUS protocol, the source device of media streams establishes an uplink session with a sink through the network. The FLUS APIs allow the source device to control the session and also the sink to provide feedback or remote control of the source device.

The current 3GPP FLUS protocol supports including NBMP Workflow Description Document (WDD) as part of a session control update by the source device. However, the protocol does not include an interaction between the source device and the sink for the management of the NBMP workflow after the establishment of the workflow. Furthermore, the protocol does not provide an architecture for the NBMP workflow manager and/or tasks to provide reporting and notification to the source device so that it can receive feedback from the running NBMP workflow to be able to dynamically manage and modify the workflow.

Embodiments of the present disclosure address the above problems and other problems.

Embodiments of the present disclosure provide a cloud-based workflow processing of an uplink streaming with the control being at the client device which is the source of the uplink. Embodiments of the present disclosure provide an architecture in which the source client is an NBMP source directly managing the workflow after establishing a FLUS session.

According to one or more embodiments, a method is provided. The method includes: sending, by a Network-Based Media Processing (NBMP) source, a request to establish a Framework for Live Uplink Streaming (FLUS) session between a FLUS source and a FLUS sink; receiving, by the NBMP source, an address of an NBMP workflow manager from the FLUS source after the FLUS session is established; and sending, by the NBMP source to the NBMP workflow manager via a path, of the address, that does not include the FLUS source and the FLUS sink, a request to create or update a workflow for processing media content.

According to an embodiment, the request is a request to create the workflow.

According to an embodiment, the request is a request to update the workflow.

According to an embodiment, the method further includes: sending, by the NBMP source to the FLUS source, a request for the NBMP workflow manager to create the workflow, wherein the request includes a workflow description document (WDD).

According to an embodiment, the method further includes: receiving, by the NBMP source from the NBMP workflow manager via the FLUS sink and the FLUS source, an updated version of the WDD before sending the request to update the workflow.

According to an embodiment, the sending the request to create the workflow occurs after the receiving the address of the NBMP workflow manager.

According to an embodiment, the method further includes: receiving a report or notification from the NBMP workflow manager, via the FLUS source and the FLUS sink.

According to an embodiment, the receiving the report or notification includes receiving descriptors, containing parameters or events that indicate the report or notification, from the NBMP workflow manager, via the FLUS source and the FLUS sink.

According to an embodiment, the address is a Uniform Resource Locator (URL).

According to an embodiment, the path is a subdomain path.

According to one or more embodiments, a system is provided. The system includes at least one memory configured to store computer program code; and at least one processor configured to access the computer program code and operate as instructed by the computer program code. The computer program code includes: session request code configured to cause a Network-Based Media Processing (NBMP) source, implemented by one or more from among the at least one processor, to request to establish a Framework for Live Uplink Streaming (FLUS) session between a FLUS source and a FLUS sink; and workflow request code configured to cause the NBMP source to send to a NBMP workflow manager, via a path of an address of the NBMP workflow manager that does not include the FLUS source and the FLUS sink, a request to create or update a workflow for processing media content, after the NBMP source receives the address from the FLUS source after the FLUS session is established.

According to an embodiment, the workflow request code is workflow creation request code and the request is a request to create the workflow.

According to an embodiment, the workflow request code is workflow update request code and the request is a request to update the workflow.

According to an embodiment, the computer program code further includes: workflow creation request code configured to cause the NBMP source to send, to the FLUS source, a request for the NBMP workflow manager to create the workflow, wherein the request includes a workflow description document (WDD).

According to an embodiment, the workflow update request code is configured to cause the NBMP source to send the request for the NBMP workflow manager to update the workflow, after the NBMP source receives an updated version of the WDD.

According to an embodiment, the workflow creation request code is configured to cause the NBMP source to send the request for the NBMP workflow manager to create the workflow after the NBMP source receives the address of the NBMP workflow manager.

According to an embodiment, the NBMP source is configured to receive a report or notification from the NBMP workflow manager, via the FLUS source and the FLUS sink.

According to an embodiment, the NBMP source is configured to receive descriptors, containing parameters or events that indicate the report or notification, from the NBMP workflow manager, via the FLUS source and the FLUS sink.

According to an embodiment, the address is a Uniform Resource Locator (URL).

According to one or more embodiments, a non-transitory computer-readable medium storing computer instructions is provided. The computer instructions are configured to, when executed by at least one processor, cause the at least one processor to: send, by a Network-Based Media Processing (NBMP) source implemented by one or more from among the at least one processor, a request to establish a Framework for Live Uplink Streaming (FLUS) session between a FLUS source and a FLUS sink; and send, by the NBMP source to a NBMP workflow manager via a path of an address of the NBMP workflow manager that does not include the FLUS source and the FLUS sink, a request to create or update a workflow for processing media content, after the NBMP source receives the address from the FLUS source after the FLUS session is established.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
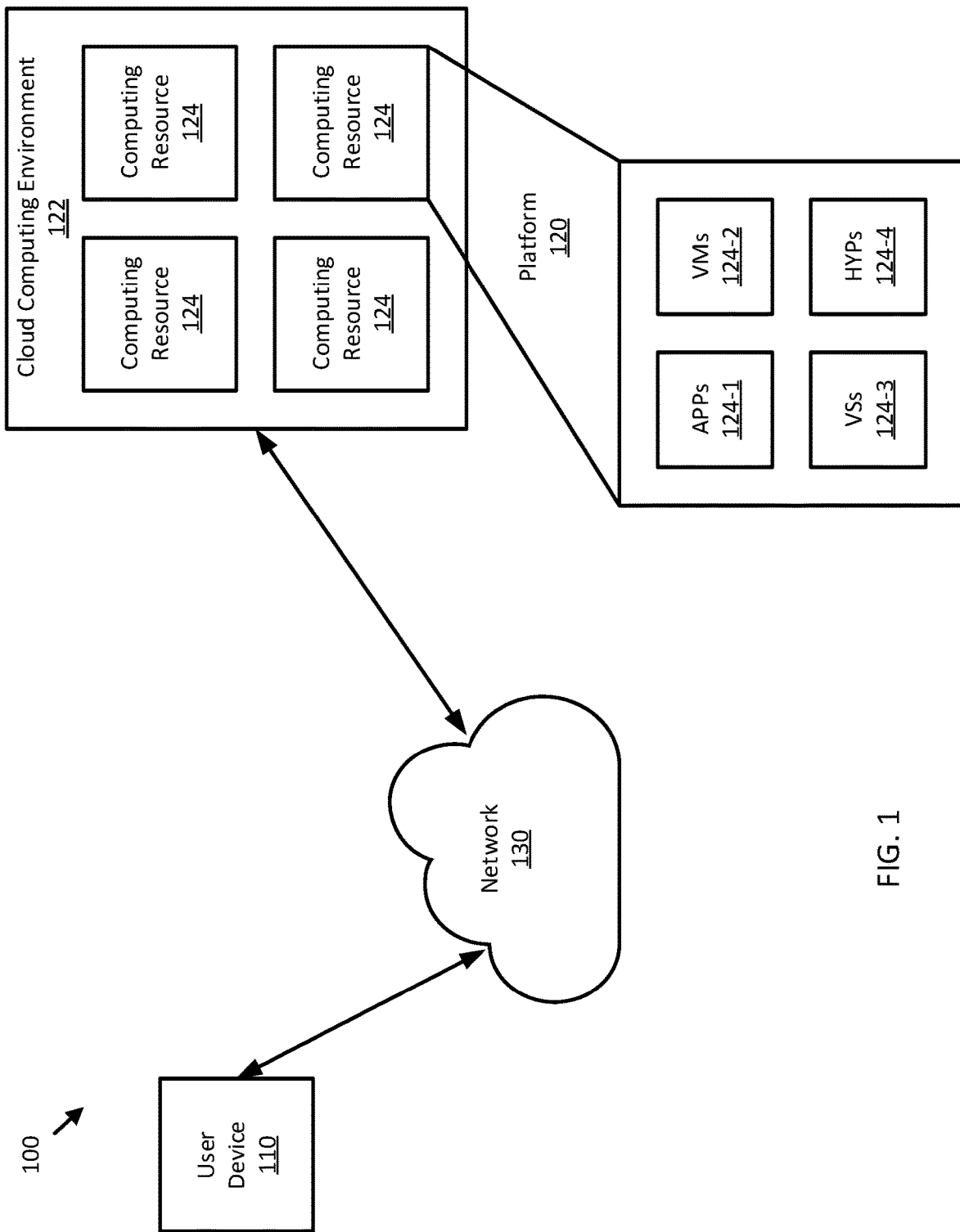
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
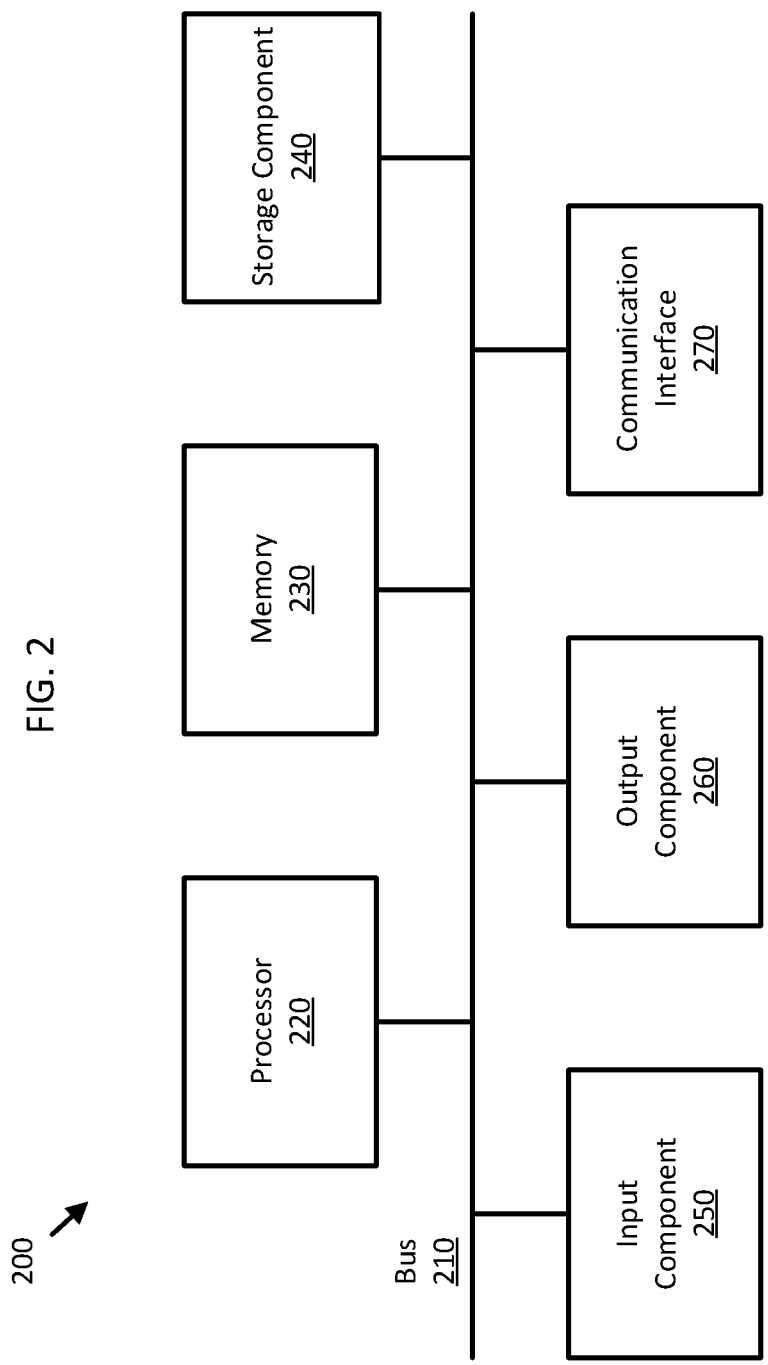
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
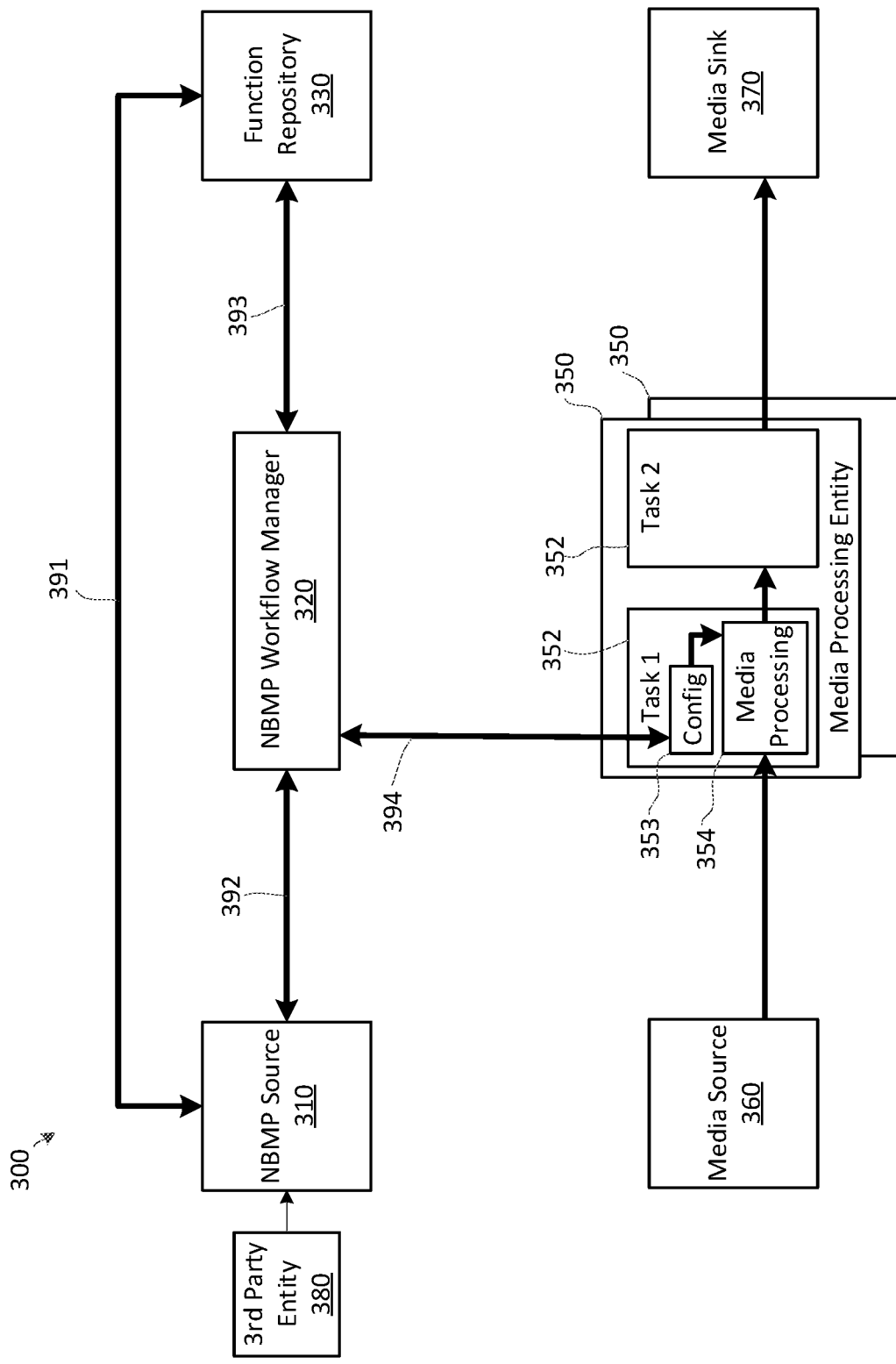
FIG. 3 is a block diagram of an NBMP system, according to embodiments.

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity 380, may communicate with the NBMP workflow manager 320 via an NBMP workflow API 392, and may communicate with the function repository 330 via a function discovery API 391. For example, the NBMP source 110 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an NBMP task API 394. The NBMP workflow manager 320 may comprise or be implemented by at least one processor and memory that stores code configured to cause the at least processor to perform the functions of the NBMP workflow manager 320.

The NBMP workflow manager 320 may use the NBMP task API 394 to setup, configure, manage, and monitor one or more tasks 352 of a workflow that is performable by the one or more media processing entities 350. In an embodiment, the NBMP workflow manager 320 may use the NBMP task API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 120 may configure the selected tasks in the workflow by using the NBMP task API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 350, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 110 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

The third party entity 380 may comprise or be implemented by at least one processor and memory that stores code configured to cause the at least processor to perform the functions of the third party entity 380.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

Figure 4:
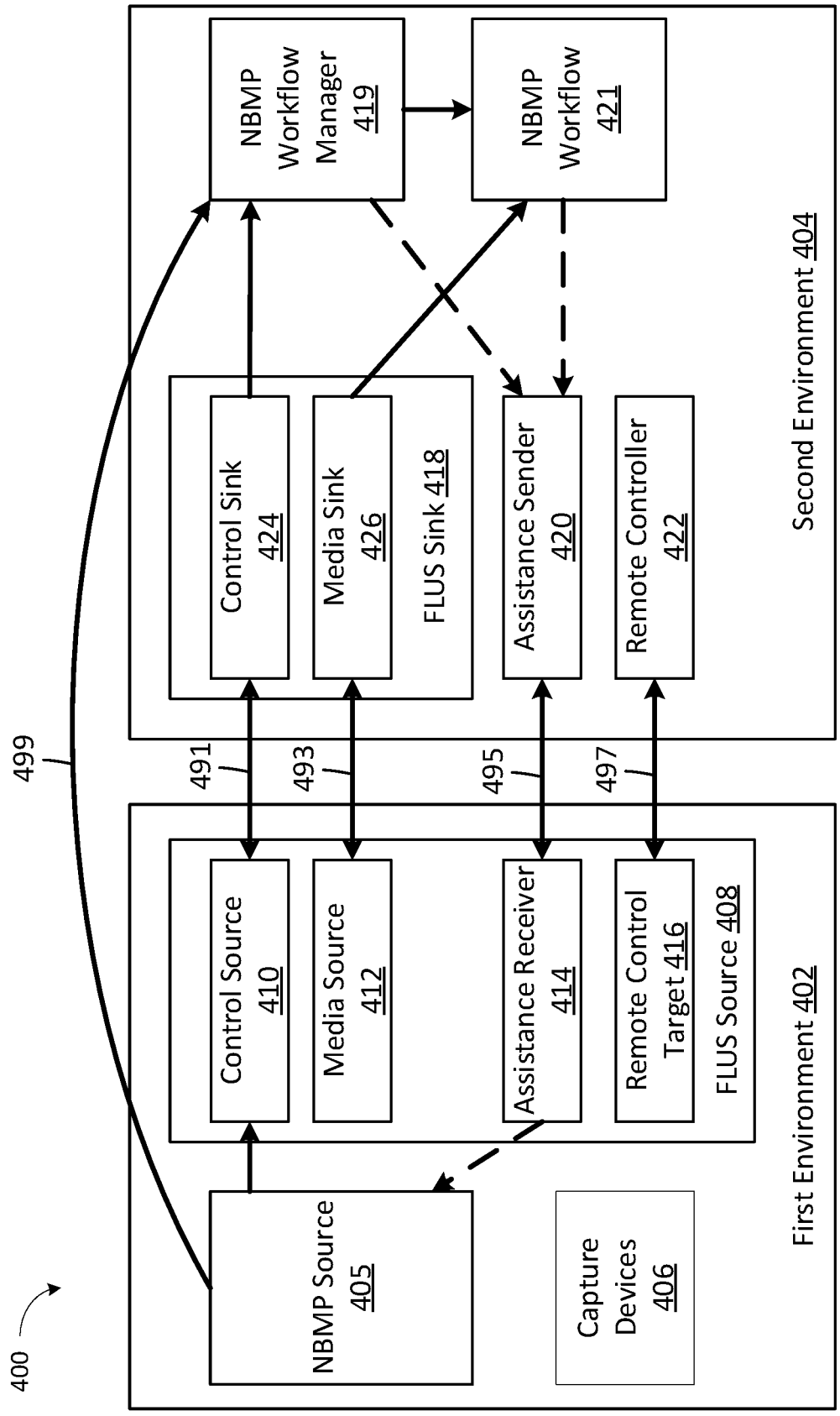
FIG. 4 is a block diagram of a 3GPP FLUS architecture, according to embodiments.

Referring now to FIG. 4, a block diagram of a 3GPP FLUS architecture 400 of an embodiment of the present disclosure is depicted. The 3GPP FLUS architecture 400 may comprise a first environment 402 (e.g. a user environment that comprises or consists of one or more user devices) and a second environment 404 (e.g a user environment or a network). The first environment 402 may comprise an NBMP source 405 (which may correspond to NBMP source 310), one or more capture devices 406, and a FLUS source 408. The FLUS source 408 may comprise a control source 410, a media source 412, an assistance receiver 414, and a remote control target 416. The second environment 404 may comprise a FLUS sink 418, an NBMP workflow manager 419 (which may correspond to NBMP workflow manager 320), an assistance sender 420, an NBMP workflow 421 (which may include, for example, tasks 352 that may be performable by at least one processor, with memory, in the second environment 4040 or another environment), and a remote controller 422. The FLUS sink 418 may comprise a control sink 424 and a media sink 426.

Any number of the NBMP source 405, capture devices 406, control source 410, media source 412, assistance receiver 414, and remote control target 416 may be implemented by a same or different at least one processor and memory, storing computer instructions, of the first environment 402. Also, any number of the control sink 424, media sink 426, assistance sender 420, remote controller 422, and NBMP workflow manager 419 may be implemented by a same or different at least one processor and memory, storing computer instructions, of the second environment 402.

Communication between the first environment 402 and the second environment 404 may be provided by, for example, a network. For example, the communication may be provided via a link 491 (e.g. an F-C link), a link 493 (e.g. an F-U link), a link 495 (e.g. an F-A link), a link 497 (e.g. an F-RC) link, and a path 499 (e.g. a direct NBMP API). The link 491 may represent end points of a communication route between the control source 410 and the control sink 424. The link 493 may represent end points of a communication route between the media source 412 and the media sink 426. The link 495 may represent end points of a communication route between the assistance receiver 414 and the assistance sender 420. The link 497 may represent end points of a communication route between the remote control target 416 and the remote controller 422. The path 499 may be a communication route between the NBMP source 405 and the NBMP workflow manager 419 that does not include the FLUS source 408 and the FLUS sink 418.

The FLUS source 408 may receive media content from one or more of the capture devices 406 within the first environment 402, or connected to the first environment, and forward the media content to the FLUS sink 426. The FLUS sink 426 may forward the media content to a decoding and rendering function and/or to a processing or distribution sub-function within the second environment 404.

The control source 410 may control, via link 491, the control sink 424 to process received media content for subsequent downstream distribution, and may select FLUS media instantiation. The link 491 may represent interactions associated with the creation and modification of the configuration of the FLUS sink 418. For example, the link 491 may allow the control source 410 to select a FLUS media instantiation, provide static metadata associated with each media session present in the FLUS session, and select and configure the processing and distribution sub-functions.

The media source 412 and the media sink 426 may, using the link 493, set up one or more media sessions and subsequent media data transmissions via media streams. FLUS media instantiation may be defined as part of a FLUS session. Multiple media streams may be established for one FLUS session. A media stream may contain media components of one or more media content types (e.g. audio and/or video). A FLUS session may be composed of one or more media streams containing, for example, the same content type (e.g. multiple media streams of video).

The assistance sender 420 may send, via the link 495, assistance messages to the assistance receiver 414. The FLUS source 408 may be configured to alter behavior of the FLUS media function (e.g. media sending behavior of the media source) within the FLUS source 408 based on the assistance messages. Assist information within assist messages may pertain to, for example, network related conditions, viewership or engagement information from content recipients, or user preference data. An example recommendation issued by the assistance receiver 414 to the media source 412 may be to only upload the first 5 seconds of video to the FLUS sink 418, due to current absence of viewership of live uplink streaming content.

The remote controller 422 may send, via the link 497, control messages to the remote control target 416. The control messages may include commands such as, for example, to start or stop a media upstreaming process in the FLUS source 408. The FLUS source 408 may be configured to alter behavior of the media source 412 based on the control messages. The remote controller 422 may, via the link 497, provide media sink information to the FLUS source 408, select a FLUS media instantiation, and determine capture device settings and other FLUS source parameters.

According to a 3GPP FLUS specification, a communication mechanism is only defined for a FLUS Session. Also, as part of updating a FLUS sink configuration, a WDD can be submitted. Finally, using a "get FLUS Sink Status" a WDD can be received.

According to embodiments of the present disclosure, the NBMP source 405 and the NBMP workflow manager 419 may be provided, which may work together directly rather than going through the control source 410 and the control sink 424. For example, the NBMP source 405 and the NBMP workflow manager may communicate via the path 499. According to embodiments, the NBMP Source 405 may define a workflow processing at the network or the destination device (e.g. the second environment 404). The NBMP workflow manager 419 and the NBMP workflow 421 may reside on the network or the destination device (e.g. the second environment 404).

Figure 5:
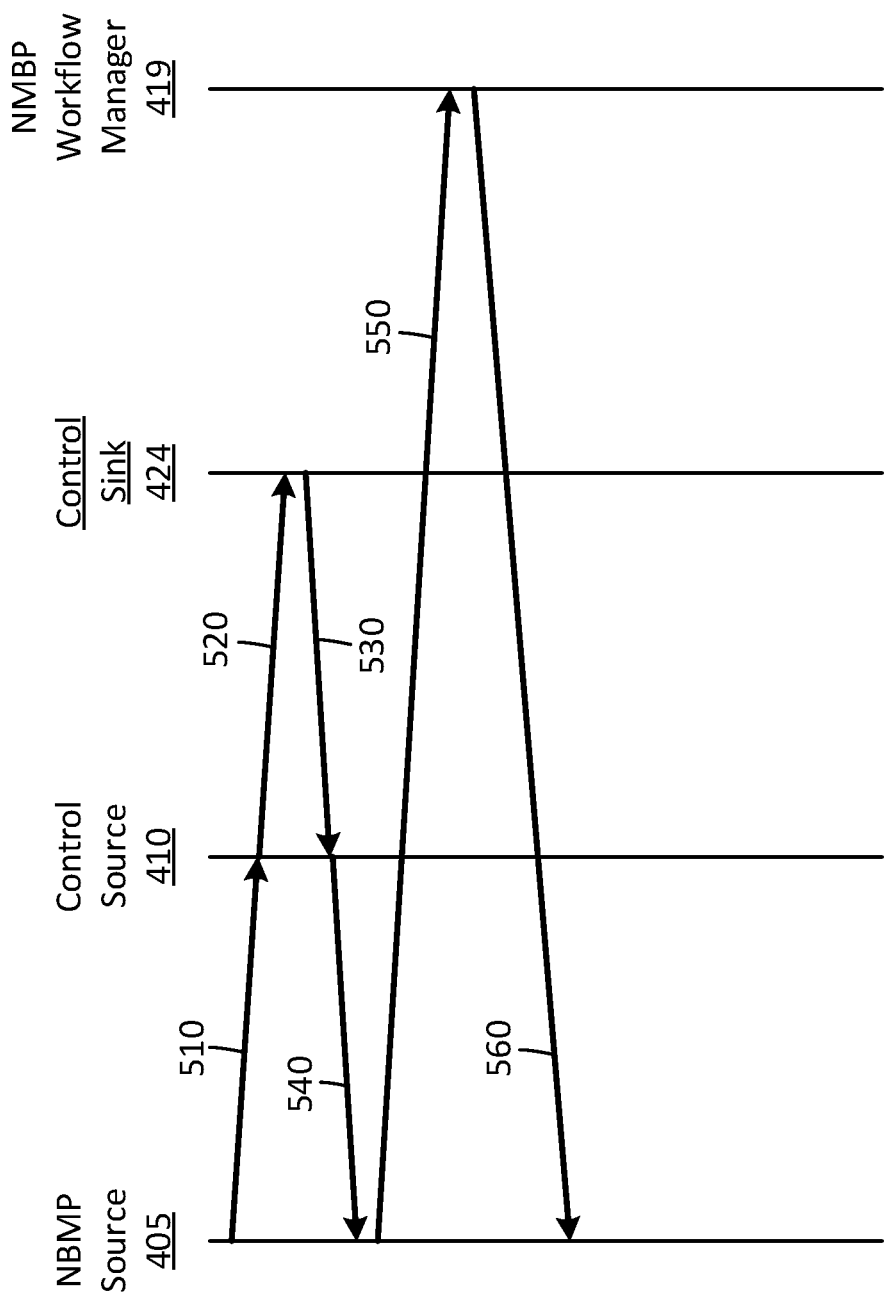
FIG. 5 is a diagram of a workflow processing according to embodiments.
Figure 7:
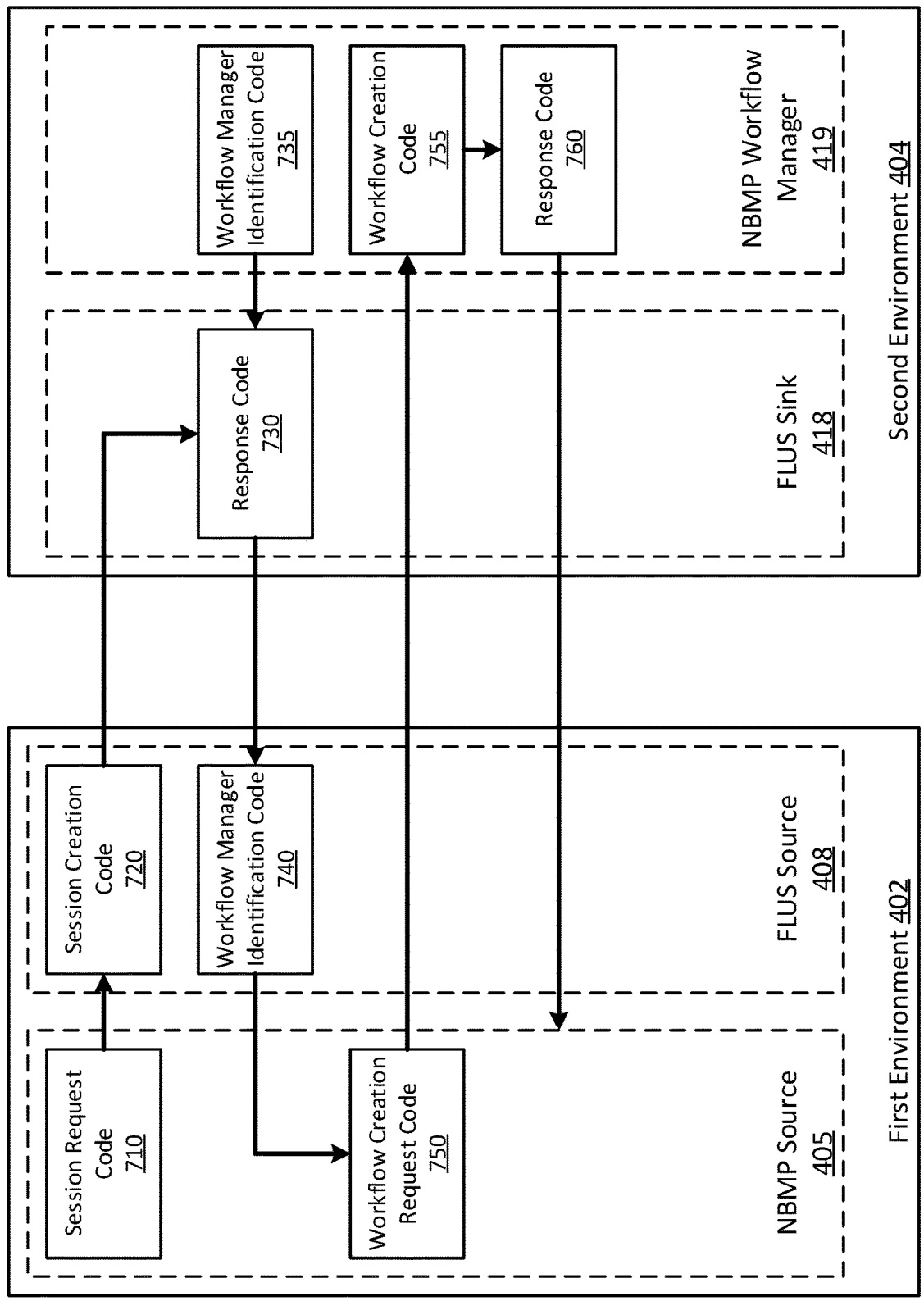
FIG. 7 is a block diagram of computer code according to embodiments.

For example, with reference to FIG. 5, the NBMP source 405 may define a workflow processing 500, which may include a direct NBMP workflow creation. With reference to FIG. 7, computer code, stored on at least one memory, may be configured cause at least one processor of the first environment 402 and the second environment 404, that implement the NBMP source 405, the FLUS source 408, the FLUS sink 418, and the NBMP workflow manager 419, to perform the workflow processing 500. Descriptions of the workflow processing 500 are provided below, with reference to FIGS. 5 and 7.

With respect to the workflow processing 500, the NBMP source 405 may first request the control source 410 to configure a FLUS session (510). Session request code 710 may be configured to cause at least one processor of the first environment 402 to perform such function of the NBMP source 405.

The control source 410 may create a FLUS sink configuration call and establish a session with the control sink 424 (520). Session creation code 720 may be configured to cause at least one processor of the first environment 402 to perform such function of the FLUS source 408.

The session may be identified with a FLUS session id (e.g. "Flus-Id") in the body of a response from the control sink 424 to the control source 410 (530). Response code 730 may be configured to cause at least one processor of the second environment 404 to perform such function of the FLUS sink 418.

Next, the control source 410 may provide the NBMP source 405 the Uniform Resource Locator (URL) for the NBMP workflow manager 419 (540). According to the 3GPP FLUS specification, a session is recognized with path '/flus/v1.0/sessions/{session-res-id}'. According to embodiments of the present disclosure, the NBMP workflow manager 419 for the session established may be identified with a subpath such as '/flus/v1.0/sessions/{session-res-id}/nbmp-wm'. Workflow manager identification code 740 may be configured to cause at least one processor of the first environment 402 to obtain and/or transmit the address of the NBMP workflow manager 419 to the NBMP source 405. Alternatively, the NBMP workflow manager 419 may return a URL as part of Workflow Resource, for the NBMP source 405 to use that URL for direct access of the NBMP workflow manager 419 via a direct path (e.g. path 499 of FIG. 4). In such alternative, workflow manager identification code 735 may be configured to cause at least one processor of the second environment 404 to obtain and transmit the URL from the NBMP workflow manager 419 to the FLUS sink 418, the response code 730 may be configured to cause at least one processor of the second environment 404 to transmit the URL from the FLUS sink 418 to the FLUS source 408, and the workflow manager identification code 740 may be configured to cause at least one processor of the first environment 402 to transmit the URL from the FLUS source 408 to the NBMP source 405.

Following, the NBMP source 405 can send (550) and receive (560) communications to and from the NBMP workflow manager 419 to create, update, get reports, and destroy a workflow using the direct path (e.g. path 499) and NBMP's Operations, as soon as the FLUS session is established. For example, request code (e.g. workflow creation request code 750) may be configured to cause at least one processor of the first environment 402 to transmit a request from the NBMP source 405 to the NBMP workflow manager 419 to create, update, get reports, and destroy a workflow, and code (e.g. workflow creation code 755 and/or response code 760) may be configured to cause at least one processor of the second environment 404 to perform the requested actions by the NBMP workflow manager 419.

By using the workflow processing 500, there may be no need to send Workflow Description Document (WDD) as "processing_description" as was suggested in the 3GPP FLUS specification. Also, in an embodiment that implements the workflow processing 500, the control source 410 of the FLUS source 408 may provide the path of the NBMP workflow manager 419 to the NBMP source 405 after establishing the FLUS session. All communication between the NBMP source 405 and NBMP workflow manager 419 may be directly achieved via, for example, path 499.

Figure 6:
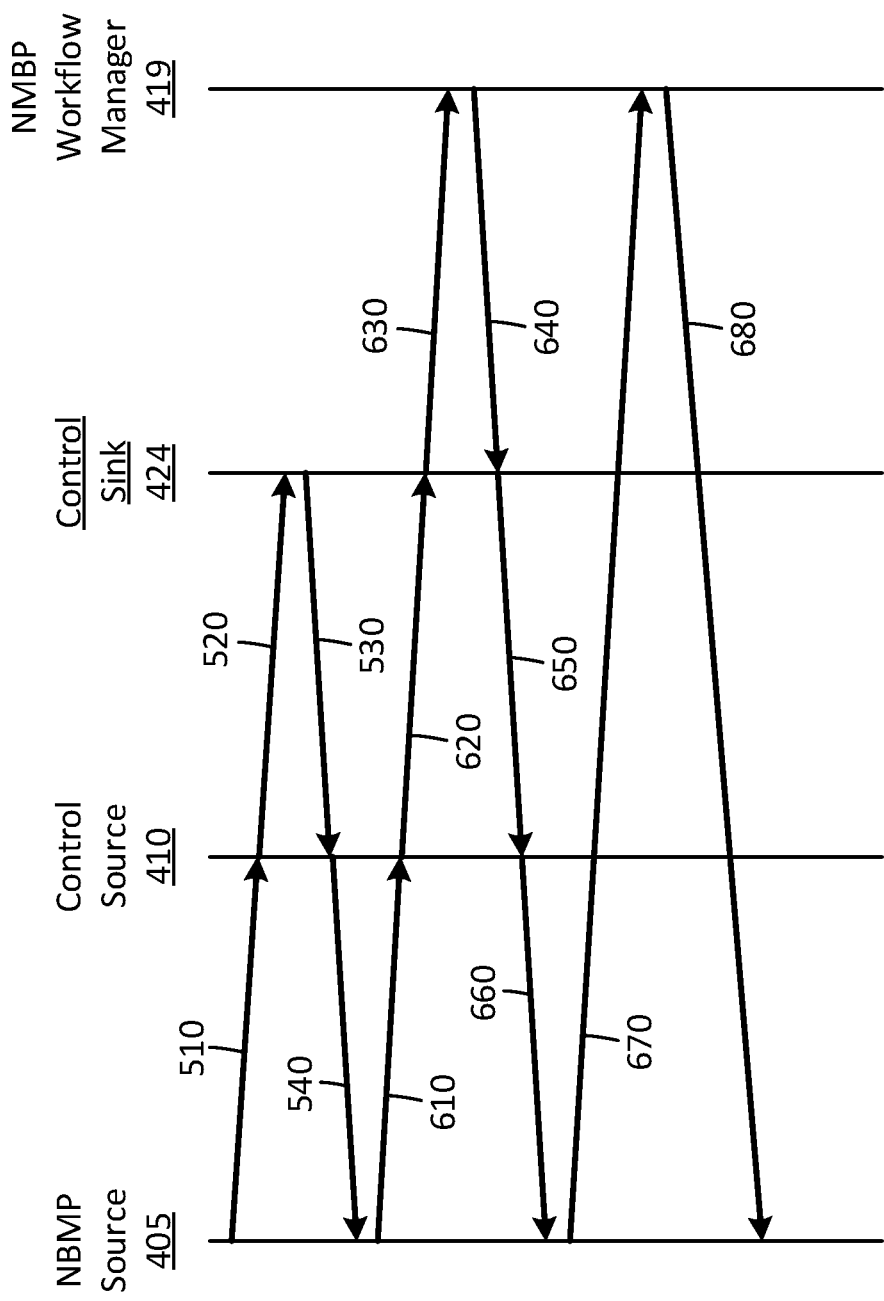
FIG. 6 is a diagram of a workflow processing according to embodiments.
Figure 8:
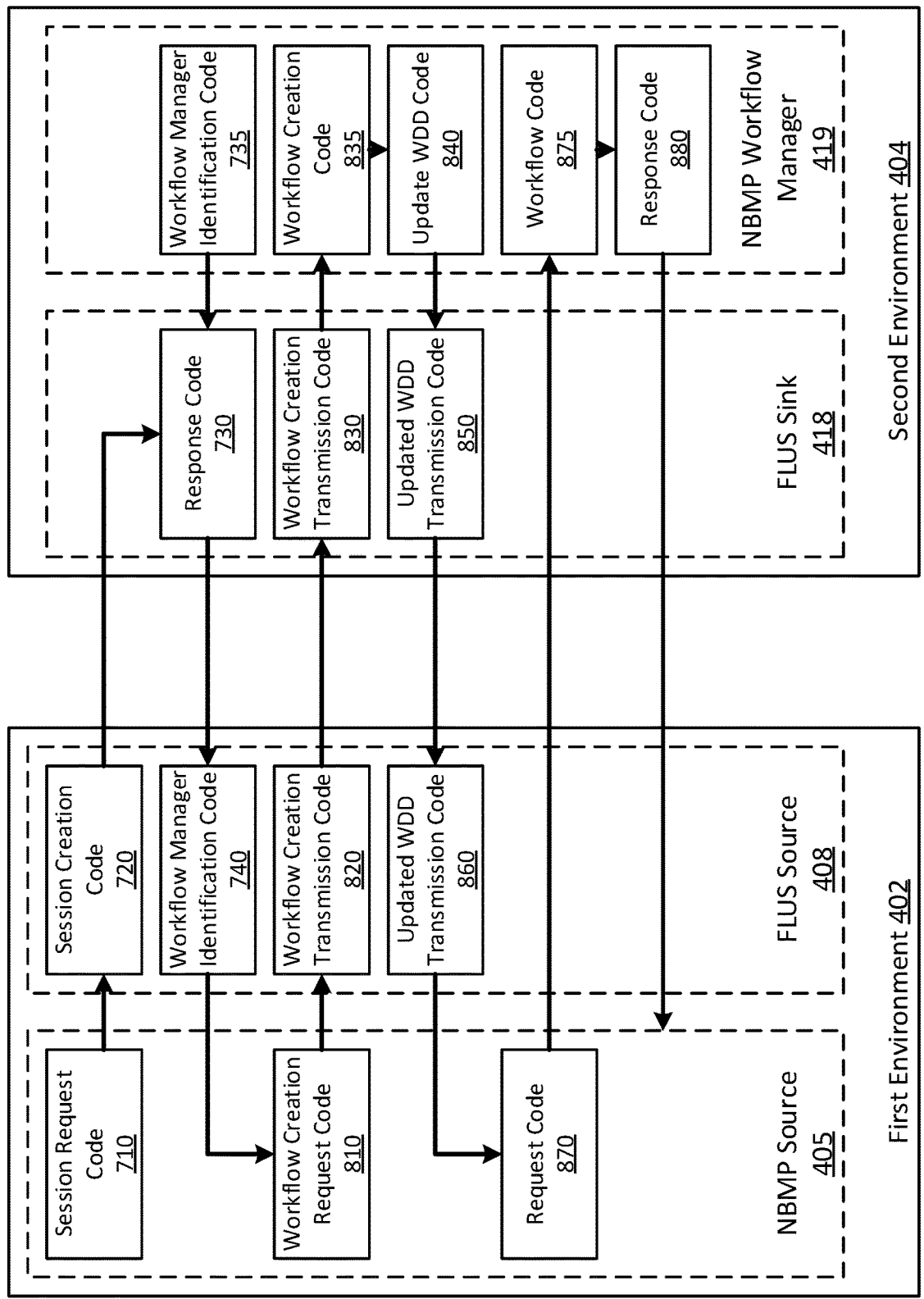
FIG. 8 is a block diagram of computer code according to embodiments.

With reference to FIG. 6, the NBMP source 405 may define a workflow processing 600, which may include an indirect NBMP workflow creation followed by direct interaction between the NBMP source 405 and the NBMP workflow manager 419. The indirect NBMP workflow creation may be via an F-C link (e.g. link 491 of FIG. 4) and the direction interaction may be via the direct NBMP API (e.g. path 499 of FIG. 4). With reference to FIG. 8, computer code, stored on at least one memory, may be configured cause at least one processor of the first environment 402 and the second environment 404 that implement the NBMP source 405, the FLUS source 408, the FLUS sink 418, and the NBMP workflow manager 419, to perform the workflow processing 600. Descriptions of the workflow processing 600 are provided below, with reference to FIGS. 6 and 8.

Same or similar to the workflow processing 500, the NBMP source 405 may first request the control source 410 to configure a FLUS session (510), the control source 410 may create a FLUS sink configuration call and establish a session with the control sink 424 (520), a response may be provided from the control sink 424 to the control source 410 (530), and the control source 410 may provide the NBMP source 405 the address (e.g. URL) for the NBMP workflow manager 419 (540).

According to embodiments, the workflow processing 600 may additionally include the following.

The NBMP source 405 may send a create request by including a WDD to the FLUS source 408 (610), consequently to FLUS sink 418 (620). For example, workflow creation request code 810 may be configured to cause at least one processor of the first environment 402 to create a request and send the request from the NBMP source 405 to the FLUS source 408, and workflow creation transmission code 820 may be configured to cause at least one processor of the first environment 402 to send the request from the FLUS source 408 to the FLUS sink 418 via, for example, the F-C link (e.g. link 491 of FIG. 4).

The FLUS sink 418 may make a CreateWorkflow operation to the NBMP workflow manager (630), which may be a request, that includes the WDD, to create a workflow. For example, workflow creation transmission code 830 may be configured to cause at least one processor of the second environment 404 to perform the above operations of the FLUS sink 418. Also, workflow creation code 835 may be configured to cause at least one processor of the second environment 404 to create the workflow by the NBMP workflow manager 419 based on the request.

Following, the NBMP workflow manager (419) may provide a response, which includes an updated version of the WDD, to the NBMP source 405 through the same path (640, 650, 660). For example, update WDD code 840 may be configured to cause at least one processor of the second environment 404 to update the WDD by the NBMP workflow manager 419 and transmit the response, including the updated WDD, to the FLUS sink 418. Updated WDD transmission code (e.g. updated WDD transmission code 850 and updated WDD transmission code 860) may be configured to cause at least one processor of the first environment 402 and the second environment 404 to transmit the response from the FLUS sink 418, to the FLUS source 408, and then to the NBMP source 405.

After this point, the NBMP source 405 may make direct Operational calls to the NBMP workflow manager 419 using the "wm-path" and the WDD's ID (670), and may receive a response directly from the NBMP workflow manager 419 (680). For example, request code 870 may be configured to cause at least one processor of the first environment 402 to generate and send an operational request (e.g. update, get report, destroy workflow) from the NBMP source 405 to the NBMP workflow manager 419. Also, code (e.g. workflow code 875 and/or response code 880) may be configured to cause at least one processor of the second environment 404 to perform the requested actions by the NBMP workflow manager 419.

In NBMP, according to embodiments of the present disclosure, the NBMP workflow manager 419 (refer to FIG. 4) and/or the tasks 352 (refer to FIG. 3) of the workflow can provide reports and notification to a third entity (e.g. third party entity 380). If the desired third entity is located in the devices, for example, in or with the NBMP source 405, then the NBMP workflow manager 419 or the task can use the F-A link (e.g. link 495) to provide those reports and notifications. As reports and notifications may be captured in the notification and reporting descriptors, identifying them is simple. As the destination of such actions may be defined by URL, the URL of destination in the form of a "path" can be defined as part of the path of the assistant receiver 414.

A method for establishment of NBMP Workflow in 5G FLUS may be provided by embodiments of the present disclosure. In the method, the URL of the NBMP workflow manager may be identified as a unique path of the session, wherein the NMBP source located in the first user environment (e.g. a device) receives the URL after the establishment of a FLUS session URL, with an additional subdomain/path, wherein NBMP source can directly communicate with NBMP workflow manager to establish a workflow and manages it using that subdomain path, without any further need to go through the FLUS F-C link, wherein the NBMP source can exploit the full features of NBMP Operations since it has direct access to NBMP workflow manager.

According to embodiments of the present disclosure, the NBMP source may alternatively send the WDD to the NBMP Workflow Manager through FLUS F-C link, receive an updated WDD with an ID of the updated WDD, and then directly interact with the NBMP workflow manager using the subdomain path established during the FLUS session configuration.

According to embodiments of the present disclosure, reporting of workflow and tasks' reports and notifications to the NBMP source or any third party located in the first user environment may be provided, via the FLUS F-A link, wherein the reports and notifications include reporting and notification descriptors respectfully, containing the parameters and events that are set to be used for these purposes.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
sending, by a Network-Based Media Processing (NBMP) source, a request to establish a Framework for Live Uplink Streaming (FLUS) session between a FLUS source and a FLUS sink;
receiving, by the NBMP source, an address of an NBMP workflow manager from the FLUS source after the FLUS session is established; and
sending, by the NBMP source to the NBMP workflow manager via a path, of the address, that does not include the FLUS source and the FLUS sink, a request to create or update a workflow for processing media content.

2. The method of claim 1, wherein the request is a request to create the workflow.

3. The method of claim 1, wherein the request is a request to update the workflow.

4. The method of claim 3, further comprising:
sending, by the NBMP source to the FLUS source, a request for the NBMP workflow manager to create the workflow, wherein the request includes a workflow description document (WDD).

5. The method of claim 4, further comprising:
receiving, by the NBMP source from the NBMP workflow manager via the FLUS sink and the FLUS source, an updated version of the WDD before sending the request to update the workflow.

6. The method of claim 4, wherein the sending the request to create the workflow occurs after the receiving the address of the NBMP workflow manager.

7. The method of claim 1, further comprising:
receiving a report or notification from the NBMP workflow manager, via the FLUS source and the FLUS sink.

8. The method of claim 7, wherein the receiving the report or notification comprises receiving descriptors, containing parameters or events that indicate the report or notification, from the NBMP workflow manager, via the FLUS source and the FLUS sink.

9. The method of claim 1, wherein the address is a Uniform Resource Locator (URL).

10. The method of claim 9, wherein the path is a subdomain path.

11. A system comprising:
at least one memory configured to store computer program code; and
at least one processor configured to access the computer program code and operate as instructed by the computer program code, the computer program code including:
session request code configured to cause a Network-Based Media Processing (NBMP) source, implemented by one or more from among the at least one processor, to request to establish a Framework for Live Uplink Streaming (FLUS) session between a FLUS source and a FLUS sink; and
workflow request code configured to cause the NBMP source to send to a NBMP workflow manager, via a path of an address of the NBMP workflow manager that does not include the FLUS source and the FLUS sink, a request to create or update a workflow for processing media content, after the NBMP source receives the address from the FLUS source after the FLUS session is established.

12. The system of claim 11, wherein the workflow request code is workflow creation request code and the request is a request to create the workflow.

13. The system of claim 11, wherein the workflow request code is workflow update request code and the request is a request to update the workflow.

14. The system of claim 13, where the computer program code further includes:
workflow creation request code configured to cause the NBMP source to send, to the FLUS source, a request for the NBMP workflow manager to create the workflow, wherein the request includes a workflow description document (WDD).

15. The system of claim 14, wherein
the workflow update request code is configured to cause the NBMP source to send the request for the NBMP workflow manager to update the workflow, after the NBMP source receives an updated version of the WDD.

16. The system of claim 14, wherein the workflow creation request code is configured to cause the NBMP source to send the request for the NBMP workflow manager to create the workflow after the NBMP source receives the address of the NBMP workflow manager.

17. The system of claim 11, wherein the NBMP source is configured to receive a report or notification from the NBMP workflow manager, via the FLUS source and the FLUS sink.

18. The system of claim 17, wherein the NBMP source is configured to receive descriptors, containing parameters or events that indicate the report or notification, from the NBMP workflow manager, via the FLUS source and the FLUS sink.

19. The system of claim 11, where the address is a Uniform Resource Locator (URL).

20. A non-transitory computer-readable medium storing computer instructions that are configured to, when executed by at least one processor, cause the at least one processor:
send, by a Network-Based Media Processing (NBMP) source implemented by one or more from among the at least one processor, a request to establish a Framework for Live Uplink Streaming (FLUS) session between a FLUS source and a FLUS sink; and
send, by the NBMP source to a NBMP workflow manager via a path of an address of the NBMP workflow manager that does not include the FLUS source and the FLUS sink, a request to create or update a workflow for processing media content, after the NBMP source receives the address from the FLUS source after the FLUS session is established.

* * * * *